United States Patent [19]

Smith et al.

[11] Patent Number: 5,671,141

[45] Date of Patent: Sep. 23, 1997

[54] COMPUTER PROGRAM ARCHITECTURE FOR ONBOARD VEHICLE DIAGNOSTIC SYSTEM

[75] Inventors: Paul Frederick Smith, Dearborn Heights; John Frederick Armitage, Dearborn; Eric Blaine Ferch, Westland, all of Mich.

[73] Assignee: Ford Global Technologies, Inc., Dearborn, Mich.

[21] Appl. No.: 43,192

[22] Filed: Apr. 5, 1993

[51] Int. Cl.⁶ .................................................. G01M 15/00
[52] U.S. Cl. ...................... 364/424.034; 364/424.036; 364/424.039; 364/423.098; 395/800; 395/183.01
[58] Field of Search ...................................... 395/800, 650; 364/424.03, 424.04, 442, 431.01; 340/438

[56] References Cited

U.S. PATENT DOCUMENTS

| | | | |
|---|---|---|---|
| 4,989,146 | 1/1991 | Imajo | 364/424.04 |
| 5,003,476 | 3/1991 | Abe | 364/424.03 |
| 5,023,791 | 6/1991 | Herzberg et al. | 364/424.04 |
| 5,034,894 | 7/1991 | Abe | 364/431.01 |
| 5,077,670 | 12/1991 | Takai et al. | 364/424.03 |
| 5,111,686 | 5/1992 | Kamiya et al. | 73/117.3 |
| 5,214,582 | 5/1993 | Gray | 364/424.03 |
| 5,220,668 | 6/1993 | Bullis | 395/650 |
| 5,325,082 | 6/1994 | Rodriguez | 340/438 |
| 5,337,013 | 8/1994 | Langer et al. | 324/537 |

OTHER PUBLICATIONS

State of California Air Resources Board, Resolution 91–42; Sep. 12, 1991; pp.. 1–2, A–1 to A–31.
SAE Technical Paper No. 911215, "On–Board Diagnostics for Emission Control Systems", Kotzan, May 15–17, 1991, pp.. 1–17.
Bogdanoff et al., SAE Technical Paper No. 912433, "Overview of On–Board Diagnostic Systems Used on 1991 California Vehicles", Oct. 7–10, 1991, pp.. 1–4.
State of California Air Resources Board, Resolution 91–42, Sep. 12, 1991, pp.. 1–2, A–1 to A–31.

*Primary Examiner*—Alyssa H. Bowler
*Assistant Examiner*—Walter D. Davis
*Attorney, Agent, or Firm*—Peter Abolins; Roger L. May

[57] ABSTRACT

A computer program architecture for a motor vehicle on-board diagnostic system includes a plurality of monitor modules for monitoring vehicle systems or components and issuing a malfunction subroutine call to a diagnostic executive upon detecting a system or component malfunction. The executive includes a plurality of software objects or modules for carrying out malfunction indicator light control and fault code storage strategies. A diagnostic scheduler module implemented as a finite state machine, controls and coordinates the sequence of the test to be run by the monitor modules as well as on-demand self tests. A malfunction indicator light (MIL) control module implements four distinct light control strategies through finite machines for illuminating and extinguishing the light and for storing and erasing fault codes under predetermined conditions.

17 Claims, 13 Drawing Sheets

COMPUTER PROGRAM ARCHITECTURE FOR ONBOARD VEHICLE DIAGNOSTIC SYSTEM

TECHNICAL FIELD

This invention relates generally to vehicle diagnostic systems and more particularly to a computer program architecture for an onboard vehicle diagnostic system.

BACKGROUND ART

In order to reduce motor vehicle emissions, a powertrain control computer (PCC) with sophisticated software is employed to precisely control engine and transmission operating conditions. The computer is programmed to control such emission sensitive factors as spark timing, fuel, exhaust gas recirculation, secondary air injection, idle speed, and canister purge. Usually the PCC is programmed to also perform diagnostic routines to verify proper actuator and sensor operation, and perform system checks, and to control a malfunction indicator light (MIL) to inform the driver of any problem. Also, fault codes may be stored for later use by service personnel.

There are a number of advantages to be realized where a highly reliable diagnostic system is provided. Not only do lower emissions result from maintaining the systems in proper working order, but greater customer satisfaction arises from being accurately informed as early as possible of a malfunction. Furthermore, as the diagnostic systems become more reliable, it is anticipated that the need for in-use emission testing will diminish.

The California Air Resources Board (CARB) adopted regulations for onboard diagnostic systems for certain 1988 model vehicles and recently amended the regulations to require more comprehensive diagnostic capabilities for 1994 model year vehicles sold in California. The regulations require a self-monitoring emission and powertrain control system running in the PCC. When a system or component is found to exceed established emission thresholds or a component is operating outside its manufacturer specified tolerances, a fault code must be stored and a malfunction indicator light on the vehicle instrument cluster must be illuminated. The present invention proposes a software system or architecture which readily permits the implementation of a control strategy that complies with the proposed regulations, has the advantages of ease of maintenance and test and is readily configurable to accommodate differing vehicle requirements.

SUMMARY OF THE INVENTION

In accordance with the present invention a diagnostic computer program is provided which includes a diagnostic executive program running in the PCC which controls and coordinates all aspects of the self-monitoring system. The program was designed using object oriented design methodology that results in a highly maintainable design requiring less memory and exhibiting high execution speed.

Status of the overall system is provided to the driver through control of a malfunction indicator light. The executive includes a scheduler module that is implemented as a finite state machine. The scheduler interfaces with eight diagnostic system monitor modules that monitor a variety of powertrain systems and components and report any malfunctions that occur. The scheduler controls and coordinates the execution of each of the eight system modules as well as the execution of a set of on-demand self-diagnostic routines.

The executive also includes a MIL controller module which controls the malfunction indicator light and the storage of fault codes. The executive also interfaces with a scan tool or other external computer through a serial data communications link in order to report all stored fault codes. The MIL controller module is implemented as four distinct finite state machines, one each for a Fuel Control System monitor, Engine Misfire monitor, and Catalytic Converter Efficiency monitor, and a fourth for the remaining five system monitors. The executive further includes a freeze frame module that captures the operational state of the vehicle when a malfunctioning system or component is detected and a trips module which identifies the completion of a trip as defined by the CARB regulation. The executive includes a system failure mode effects management software module which prevents a system monitor from running, in the event a different component failure would lead to false results from the monitor. Finally, the executive contains a codes module which contains utility routines for manipulating fault code data. The software system is configurable through a variety of software switches contained in read only memory.

BRIEF DESCRIPTION OF THE DRAWINGS

A more complete understanding of the present invention may be had from the following detailed description which should be read in conjunction with the drawings in which.

DETAILED DESCRIPTION OF PREFERRED EMBODIMENT

Figure 1:
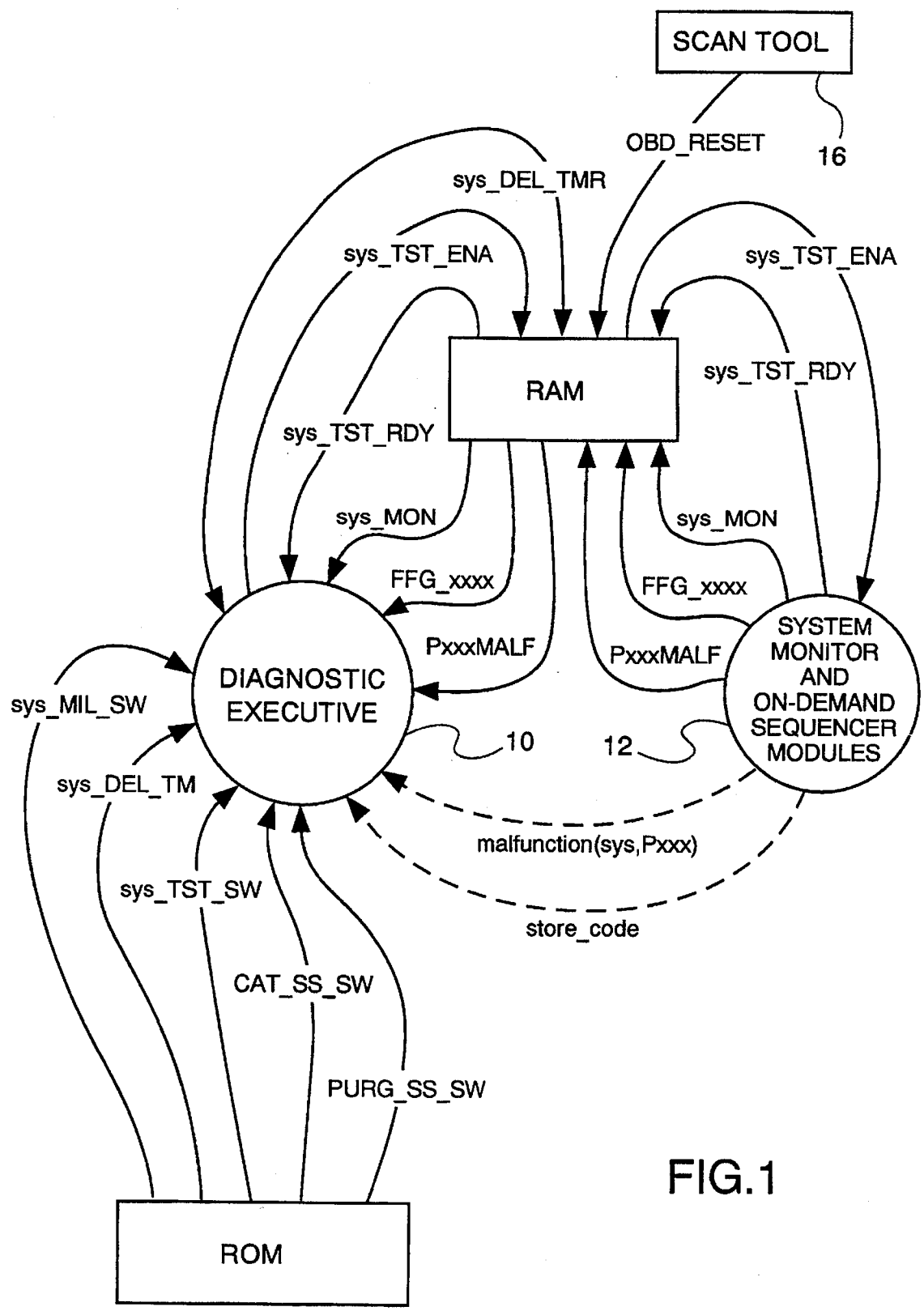
FIG. 1 is a high level data flow diagram of the present invention.
Figure 5:
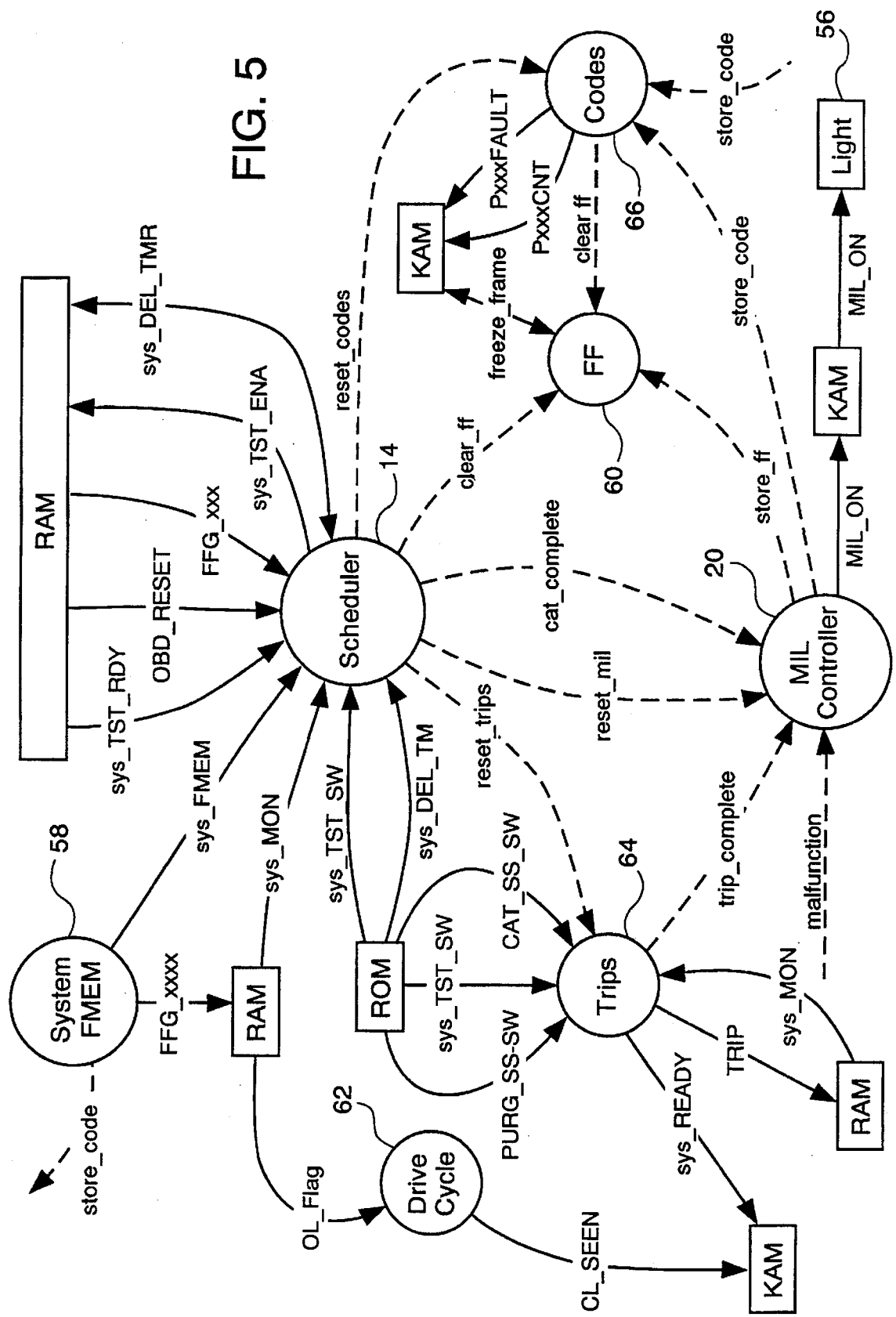
FIG. 5 is a data flow diagram of the diagnostic executive of FIG. 1.

Referring now to the drawings, and initially to FIG. 1, a high level data flow diagram of the diagnostic system program of the present invention is shown. The system program includes an executive program 10 which interfaces with a plurality of diagnostic monitor modules and on-demand sequence modules generally designated 12 through a diagnostic scheduler 14 (FIG. 5). The executive program 10 functions as a traffic cop, managing the sequencing and concurrency of all tests. Each test can be viewed as an individual task, which may or may not be able to run concurrently with other tasks. The modules 12 and the executive 10 communicate data through Random Access Memory (RAM) of the PCC as shown by the solid lines in the drawing. The modules 12 also issue malfunction and store_code subroutine calls to the executive as shown by the dash lines in the drawings. A scan tool generally designated 16 is a hand held unit that can access the diagnostic computer's RAM. The scan tool can command a reset of all onboard diagnostic information by setting an OBD_RESET flag in RAM and can request that various on-demand self diagnostic routines be performed.

A separate monitor module is provided for each of a plurality of powertrain systems or components in order to test for a malfunction and to report the malfunction to the executive program 10. Each monitor module includes the software and hardware needed to decide if a system or component has degraded to a point where established emission thresholds are exceeded or a component exceeds manufacturer specified tolerances. Of the eight system monitor modules, four perform tests that are intrusive and four perform tests that are non-intrusive. The intrusive tests are so designated because they take control of the engine for a short period of time. It is important to insure that the software modules controlling the intrusive tests are run in a particular sequence in order to avoid false malfunction detection. The intrusive tests include those run by an exhaust gas oxygen (EGO) monitor module, a secondary air system (SAIR) monitor module, an evaporative system (PURG) monitor module, and a catalytic converter efficiency (CAT) monitor module. The non-intrusive tests include those run by a fuel control system (FUEL) monitor module, an engine misfire (MIS) monitor module, an exhaust gas recirculation (EGR) system monitor module, and a comprehensive components (CCM) monitor module.

A test ready flag (sys_TST_RDY), where "sys" may be any one of the various modules represented generally at 12, is controlled by the particular module and is set when the module is ready to run its test to inform the executive of the status of the module test. The executive, in accordance with its own internal coding will, if appropriate, eventually respond by setting a sys_TST_ENA flag for each monitor in order to grant permission to run the test. The setting of both a test ready flag and a test enable flag is necessary and sufficient to indicate that the test is currently running. If either one is cleared, then the test for that particular system is not running. A test complete flag (sys_MON) is set by the module when the test is completed and is cleared on each power up of the computer. A fault flag (FFG_xxxx) identifies a particular system or component fault. For example, FFG_ECT is a fault flag for the engine coolant temperature sensor. FFG_MISFIRE is a flag indicating that the engine is currently misfiring. The fault flags are used in a system failure mode effects management (FMEM) strategy embedded in the executive 10. FMEM will disable certain of the modules through the sys_TST_ENA flag, in order to prevent a cascade of fault codes from a single component or system failure. The fault flag is an instantaneous recognition of a malfunction detection.

The malfunction subroutine call from any one of the modules 12 to the executive 10 is not made until the detected fault indicated by FFG_xxxx has been verified through a fault filtering action which involves waiting a fixed time interval in order to verify the fault. The delay may be for different time intervals depending on the fault which has been detected. A malfunction flag (PxxxMALF) is set whenever the malfunction subroutine call is made. This is an indication that the system or component is currently considered to have malfunctioned. In other word, a fault has been detected, fault filtering has taken place and the fault has been reported to the diagnostic executive. The PxxxMALF flag is cleared if the malfunction ceases to exist.

Diagnostic system configuration information is stored in read only memory (ROM) of the PCC. This information identifies which modules are present in the vehicle, since some vehicles may not include all modules. A system test switch (sys_TST_SW) informs the executive whether the module is present. A system MIL switch (sys_MIL_SW) informs the executive 10 whether a malfunction in the system, as reported by a module, should illuminate the light. Clearing the sys_MIL_SW bit prevents the light from being illuminated but will not affect the storage of fault codes or control of the fault code data structure. The system delay time (sys_DEL_TM) specifies a time interval that is loaded into a software timer (sys_DEL_TMR) after an abort of the actively executing module. This data establishes the time interval which must pass before the test can be re-initiated. The timer is decremented by the executive until it reaches zero, at which time the module may be given permission to run the test by setting the sys_TST_ENA flag. Two other configuration items, the catalyst steady state switch (CAT_SS_SW) and the purge steady state switch (PURG_SS_SW) establish whether the catalyst and purge tests must be run before a trip can be considered completed. That is, if CAT_SS_SW is set to 1, a steady speed check is being employed for catalyst monitoring and is therefore not required to be completed prior to completing a trip.

Figure 2:
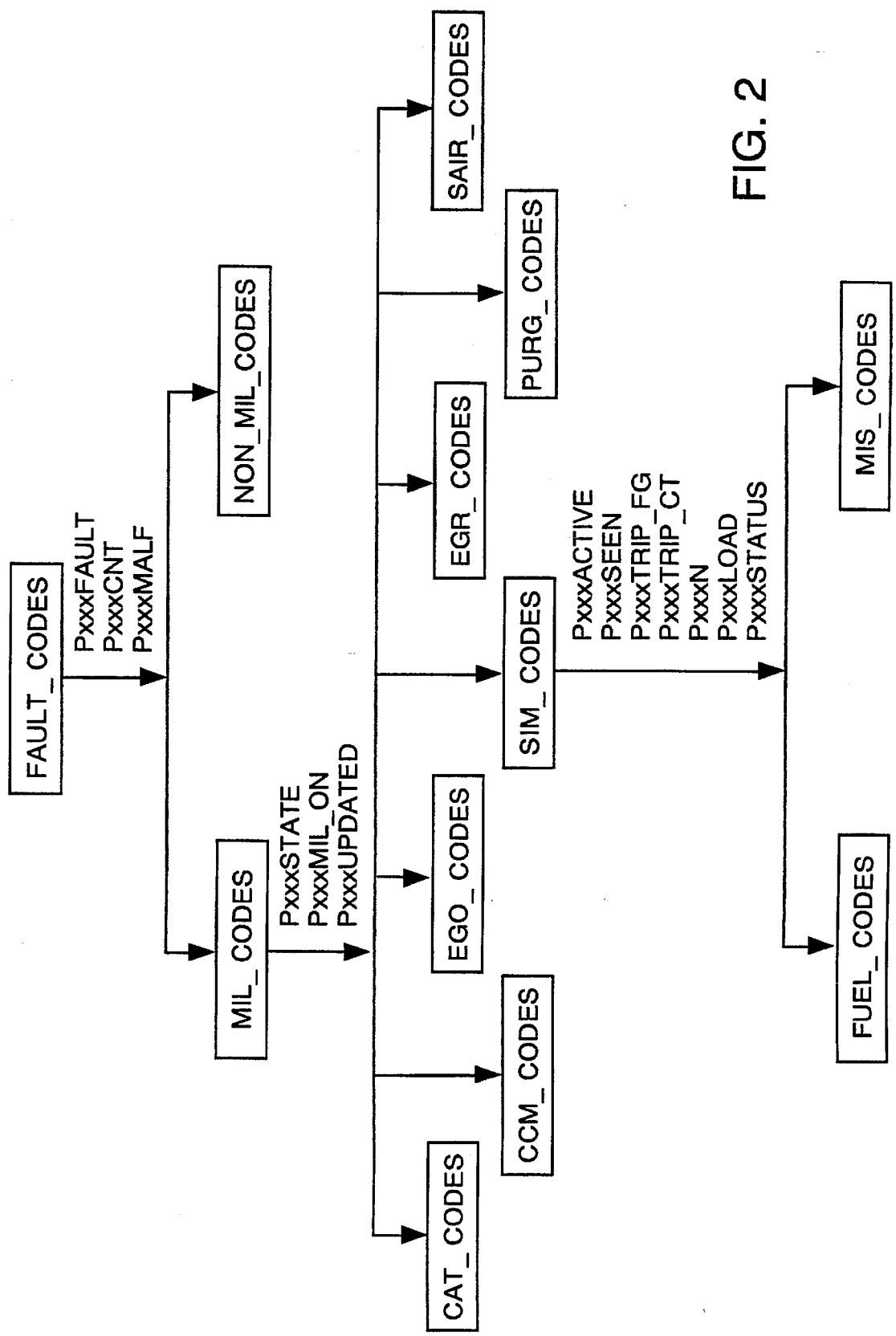
FIG. 2 depicts the fault code data structure of the invention.

FIG. 2 depicts the fault code data structure upon which the diagnostic executive is based. Records of data are stored in computer memory for each distinct fault code. The fault codes are used to report the operational state of the emission control system to the outside world. This information is essential to repair the vehicle and to monitor the operational status of the emission control system on the engine. A specific fault code is identified by Pxxx, where 'xxx' is the fault code number. For example, fault code 131 is referred to as P0131. Special sets of fault codes are referred to by labels, such as EGR_CODES, PURG_CODES, etc. The label, EGR_CODES refers to the set of fault codes having to do with EGR, while PURG_CODES refers to the set of fault codes having to do with the purge test.

The fault code data record is designed to minimize the amount of memory required by each distinct fault code and at the same time hold all information required to control the malfunction indicator light and the fault information required by an offboard diagnostic unit. As shown in FIG. 2 there are three different classes of fault code data structures:

1. NON_MIL_CODES which are maintained to aid in the diagnosis and repair of the vehicle namely, PxxxFAULT, PxxxCNT, and PxxxMALF.

2. MIL_CODES which include the NON_MIL_CODES plus additional codes which are used primarily to control the MIL, PxxxSTATE, PxxxMIL_ON, and Pxxx-UPDATED.

3. SIM_CODES which contains all the information in the MIL_CODE plus additional codes used by the fuel and misfire monitor modules to control the light, namely the similar conditions information, PxxxACTIVE, PxxxSEEN, PxxxTRIP_FG, PxxxTRIP_CT, PxxxN, PxxxLOAD, and PxxxSTATUS.

The following is a detailed description of each piece of information in the various fault code records. These fault codes will be used throughout the following discussion of the invention. The fault code number is different for each component or system being monitored and as previously mentioned is represented by "xxx".

PxxxFAULT: The fault bit. This is a single bit of data, either 1 or 0. When set to 1, the fault that corresponds to the data record in which PxxxFAULT is a member, has been stored. PxxxFAULT is a member of all three classes of fault code records.

PxxxCNT: The warm-up counter. This is an integer that takes on values between 0 and 40. 40 warm-up cycles must occur to erase a fault bit, if the fault has not occurred again and the fault is not currently illuminating the light. PxxxCNT is a member of all three classes of fault code records.

PxxxMALF: The malfunction bit. This is a single bit of data, either 1 or 0. When set to 1, a malfunction currently exists for the given device or system that corresponds to this fault code number. This information is cleared each time the computer is powered up. PxxxMALF is a member of all three classes of fault code records.

PxxxSTATE: The state register. This is an integer that takes on values between 0 and 5. This information is used to identify the state of the MIL control finite state machine for this particular fault code number. The meaning of the PxxxSTATE values is different for each of the four different types of MIL control finite state machines.

PxxxMIL_ON: The MIL bit. This is a single bit of data, either 1 or 0. When set to 1, the corresponding fault is currently illuminating the light.

PxxxUPDATED: The updated bit. This is a single bit of data, either 1 or 0. When set to 1, the fault code data record that contains this bit has been updated as the result of a malfunction identification or trip completion (under some conditions) since the computer was powered up. This bit is cleared each time the computer powers up.

PxxxACTIVE: The active bit. This is a single bit of data, either 1 or 0. When set to 1, the computer is actively in the process of counting trips without the occurrence of the corresponding malfunction and without seeing similar conditions.

PxxxSEEN: The similar conditions seen bit. This is a single bit of data, either 1 or 0. This bit is set to 1, if during a drive cycle, similar conditions to those existing at the time of the original fuel or misfire fault, have occurred.

PxxxTRIP_FG: The trip flag bit. This is a single bit of data, either 1 or 0. When set to 1 this implies that a trip occurred while the fault code record corresponding to this fault code number was in a state that indicated a single malfunction had been recorded, but the light had not yet been illuminated.

PxxxTRIP_CT: The trip counter. This is an integer that takes on values 0 to 80. The counter keeps track of the number of trips that have occurred with only one malfunction recorded for this fault code number and without seeing similar conditions. When this value reaches 80, PxxxFAULT is cleared.

PxxxN: The similar conditions engine speed. This is a number that represents the engine speed in rpm at the time the first malfunction was recorded for this fault code record.

PxxxLOAD: The similar conditions engine load. This is a real number that represents the percent engine load at the time the first malfunction was recorded for this fault code record.

PxxxSTATUS: The similar conditions engine warm-up status. This is a single bit of data, either 1 or 0 that represents the engine warm-up status (1 being warm) at the time the first malfunction was recorded for this fault code record.

Except for PxxxMALF and PxxxUPDATED, which are stored in RAM, the remaining fault code data structure is maintained in keep alive memory (KAM).

Figure 3:
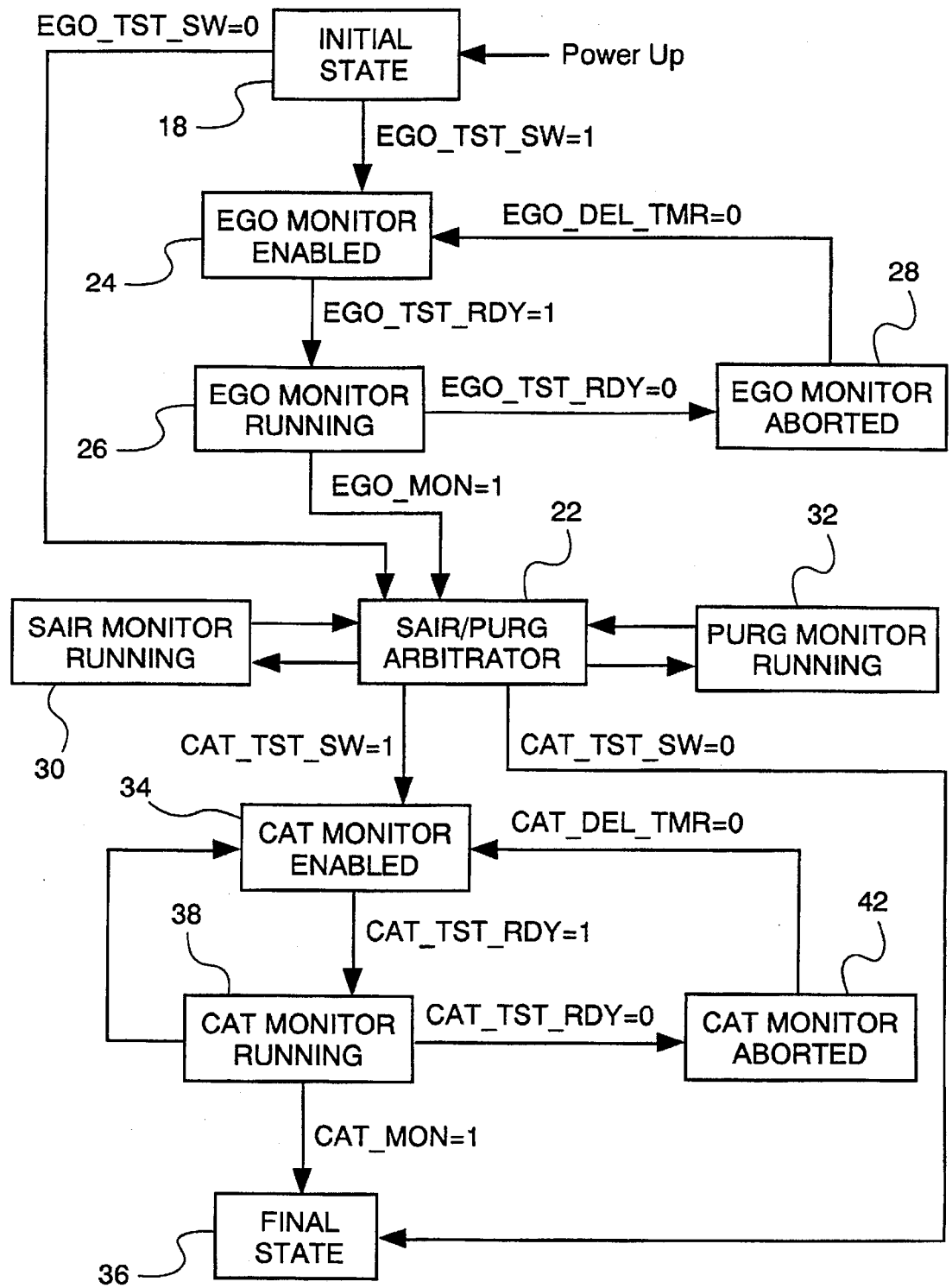
FIGS. 3 and 4 are state diagrams of the scheduler showing the various states for running the intrusive monitor tests and the on-demand self diagnostic routines respectively.

Referring now to FIG. 3, a state diagram of the finite state machine implementation of the scheduling function with respect to the system monitors is shown. The scheduler module 14 (FIG. 5) enables/disables diagnostic tests in order to provide mutual exclusion between tests that are intrusive, or would otherwise interfere with one another and sequences tests such that when a test runs, each input that it relies upon has already been tested. The scheduler module 14 also performs elegant transitions between the various states of the diagnostic system, so as not to adversely affect the operation of the vehicle. With respect to these and other state diagrams discussed hereinafter, each block represents a state of the machine and arrows represent the direction of transitions between states. Certain conditions, which will be described, will cause a transition to be taken and certain actions will be taken when a transition occurs. The machine can be in only one state at a time and will remain in a given state until an event occurs to cause a transition. No other transitions can be taken other than those shown. On power up there is a small delay to permit the system to stabilize to an initial state 18. Immediately thereafter, the non-intrusive monitor modules (MIS, FUEL, CCM, EGR) are activated and continuously monitor and report any malfunction to a MIL controller module 20 (FIG. 5) of the executive 10. At the same time, in parallel with the activation of the continuously running monitor modules, the intrusive monitor modules are activated in a sequence that is enforced by the scheduler. It should be understood in the following discussion, though not specifically stated in each instance for the sake of brevity, that in order for a test to be run, the test must be available as established by the associated sys_TST_SW in calibration ROM, the test must not yet have been completed, that is, the sys_MON flag is clear, and the associated sys_FMEM flag is clear, indicating there are no other failures that would prevent accurate data from being obtained if the test is run.

If while in the initial state 18 the EGO test is not available or has been completed, the EGO test is disabled and the machine transitions to the SAIR/PURG arbitrator state 22, otherwise the EGO test is enabled and the machine transitions to the EGO monitor enabled state 24. If the EGO test is ready to run (EGO_TST_RDY=1), the machine transitions to an EGO monitor running state 26. If prior to completion of the EGO test, the EGO test ready flag is cleared or the EGO_FMEM flag is set, the machine transitions to an EGO monitor aborted state 28, the EGO test is disabled and the EGO test delay time is begun. Upon completion of the delay interval (EGO_DEL_TMR=0) and a clearing of the FMEM flag, the machine returns to the state 24 and will transition to the state 26 when the EGO test is ready. When the EGO test is completed (EGO_MON=1), the EGO test is disabled and the machine transitions from state 26 to the SAIR/PURG arbitrator state 22. The machine will transition to either the SAIR monitor running state 30 or the PURG monitor running state 32 depending upon which test is ready. When the SAIR or PURG test is completed, the machine transitions to the state 22 and runs the other of these two test if it has not already been run. If while running either the SAIR or the PURG test, the associated FMEM flag is set or the associated test ready flag is cleared, the machine transitions to state 22 and awaits the expiration of the delay time before attempting to re-run these tests. Upon completion of both the SAIR test (SAIR_MON=1) and the PURG test (PURG_MON=1), as well as the non-intrusive EGR test (EGR_MON=1), the machine transitions to state 34 where the CAT monitor module is enabled. If the CAT test is not available or the CAT test has already been completed, the CAT test is disabled and the machine transitions to a final state 36. If the CAT test is ready (CAT_TST_RDY=1), the machine transitions to state 38 where the CAT monitor test is run. When the CAT test is done (CAT_MON=1), the CAT test is disabled and the machine transitions to the final state 36. The machine transitions to the state 42 where the CAT monitor is aborted, if the associated FMEM flag is set (CAT_FMEM=1) or the test ready flag is cleared (CAT_TST_RDY=0) before the test is completed. In transitioning to the state 42, the CAT test is disabled and the test delay (CAT_DEL_TMR=CAT_DEL_TM) is started. If the FMEM flag has cleared by the expiration of the time delay, the CAT monitor is once again enabled and the machine transitions to the state 34 and eventually transitions to the state 38 when the CAT test ready flag is set.

Figure 4:
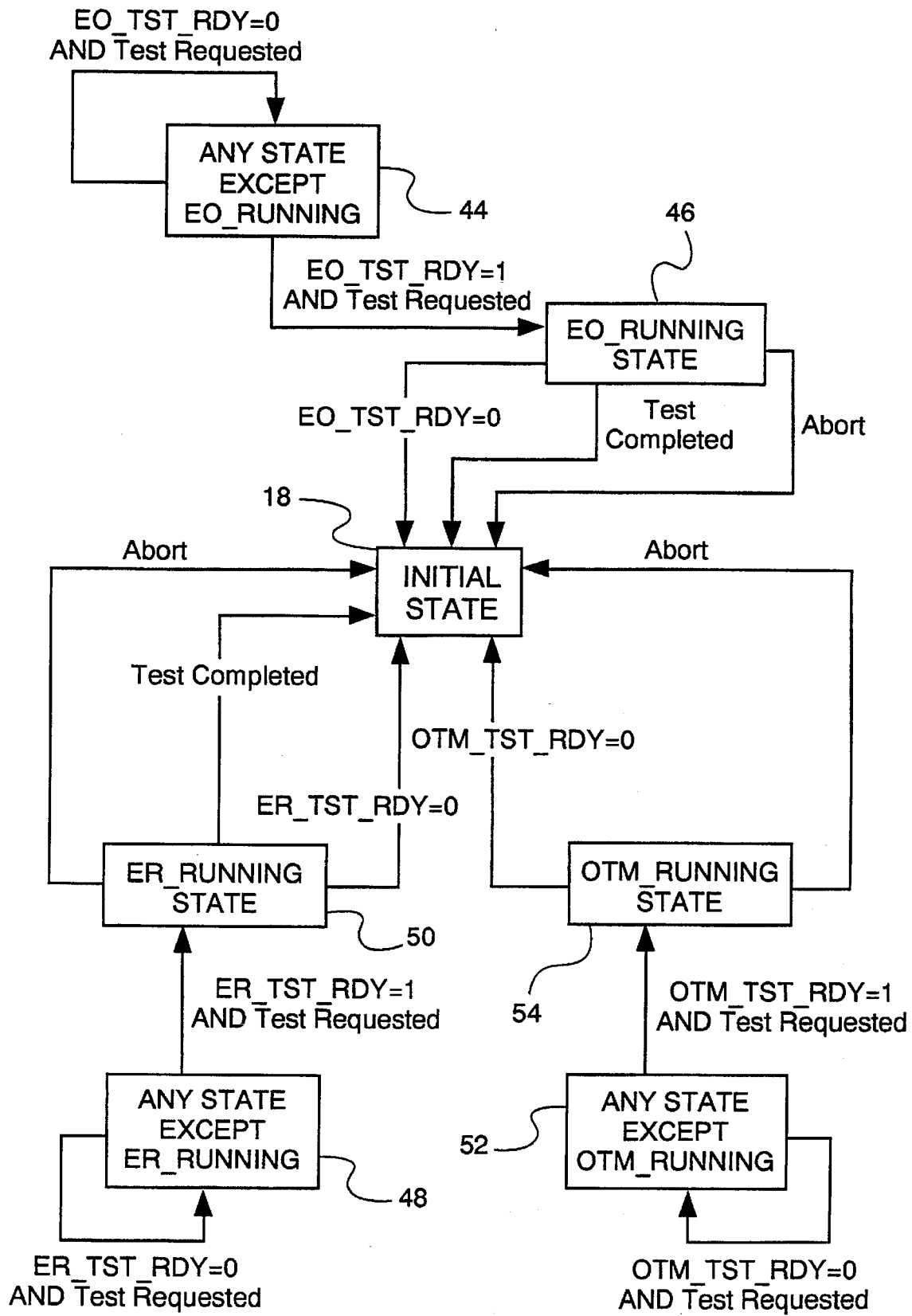

Referring now to FIG. 4 the state diagram of the scheduling function with respect to the on-demand self test procedures is shown. The scheduler module (FIG. 5) enables and controls the sequence of on-demand test that are run in response to a self test request from the scan tool 16 or other external test equipment. There are a number of diagnostic procedures that are run on-demand to test the powertrain control system. These procedures may be classified in two main groups, those performed with the engine off (EO) and those performed with the engine running (ER). In addition, an output test mode (OTM) may be run to check certain output devices. To request a self test, the scan tool 16 sets one of three flags (EO_START, ER_START, OTM_START) in RAM. The on-demand (od) test subroutines or modules interface with the scheduler module in a similar fashion to the system monitor modules 12. Test readiness is communicated though od_TEST_RDY and od_MON flags. Tests are enabled by the scheduler through od_TEST_ENA flags. The status of the various test conducted within the three broad classifications is communicated though a status register. Malfunction and store_code subroutine call are made from the on-demand test modules to the scheduler or MIL controller modules of the executive as appropriate.

If an engine off self test is requested (EO_START=1) but is not ready to be run (EO_TST_RDY=0), then an error message is returned to the ODU and the machine remains in its present state as indicated by the block 44. On the other hand, or as soon as the EO_TST_RDY flag is set indicating that the engine off module is ready to run the engine off self test procedure, the engine off self test request will cause a transition to state 46, a confirmation message is returned to the ODU, all system monitors are disabled and the engine off self test is enabled. While in the EO_running state, the engine off sequences module causes the various test to be performed in a particular sequence. The status of the engine off tests being performed is available to the sequences through the status register. When all test procedures have been run, the test is disabled, a message is sent to the scheduler indicating the availability of the test results, and the machine transitions to the initial state as indicated by the block 18 from whence it will transition to the state existing at the time of the on-demand self-diagnostic request. If prior to test completion, an abort command is received from the scheduler or if the EO_TST_RDY flag is cleared, the machine transitions to the initial state and in the case of an abort command, a confirmation message is sent to the ODU.

A similar sequence of events occurs if a request is received to perform the engine running self-test procedure. The machine transitions from a state indicated by the block 48 to the state indicated by the block 50 if the engine running test is requested and the engine running test ready flag (ER_TST_RDY) is set. Otherwise the machine remains in the state indicated by the block 48 and sends an error message to the ODU. The machine transitions from state 50 to the initial state 18 upon an abort command or the clearing of the ER_TST_RDY flag.

Likewise, if a request is received to perform the output test mode (OTM) procedures a similar sequence of events occurs. The OTM procedures test specified output devices. The machine transitions from a state indicated by the block 52 to the state indicated by the block 54 if the output test mode is requested and the output test mode ready flag (OTM_TST_RDY) is set. Otherwise the machine remains in the state indicated by the block 52 and sends an error message. The machine transitions from state 54 to the initial state 18 upon test completion, an abort command or the clearing of the OTM_TST_RDY flag.

Referring now to FIG. 5, a data flow diagram of the various software modules of the executive program is depicted. The executive includes the MIL controller module 20, which controls the energization of a malfunction indicator light 56. The light 56 is located on the instrument panel and alerts the driver that the computer has detected a malfunction with the system and that the driver should seek service at his earliest convenience. The executive also includes the system FMEM module 58 that controls the state of sys_FMEM flags that are used by the scheduler 14 to determine if a system monitor should be allowed to execute. If an individual system monitor's corresponding sys_FMEM flag is set, then some component or system upon which the monitor depends for its proper functioning has faulted, and the monitor may give false results if it is executed. If the corresponding sys_FMEM flag is cleared, then all information upon which the system monitor depends for its proper functioning is assumed by the scheduler to be valid, or not yet monitored. The system FMEM module 58 also controls a set of non-MIL fault codes. These fault codes are used to identify intermittent faults on a set of sensors. The related strategy identifies when a currently running system monitor module is aborted because an intermittent fault of the sensor is detected. After the monitor has been aborted a predetermined number of times and the monitor has not yet been completed and the inspection maintenance readiness code is stored, an additional fault code will be stored identifying the intermittent sensor. There are five such codes, one each for engine coolant temperature, intake air temperature, throttle position sensor, vehicle speed sensor, and mass air flow sensor. The inspection maintenance code, when set, requires additional mixed city/highway driving to complete a full diagnostic check of all components and systems. The predetermined number of times the monitor is aborted prior to storing the code is selected so that the code can be stored after driving for some reasonable amount of time at the required operating conditions to execute all system monitors during a repair verification procedure.

A freeze frame module 60 is provided to capture data corresponding to certain vehicle operating conditions of interest, such as engine speed, load, and coolant temperature, as well as other data, at the time of a malfunction in order to later determine why a particular malfunction may have occurred. The first time a malfunction occurs for any MIL_code, the freeze frame conditions are stored in a data structure in KAM. If the malfunction was not a fuel or misfire malfunction, the data can be overwritten by a subsequent fuel or misfire malfunction. Fuel and misfire malfunctions cannot overwrite one another. The freeze frame conditions are cleared on system reset or when the fault for which they are stored is erased. As indicated, there are two separate entry points or calls to the module 60. One (store_ff) is used to store the freeze frame conditions, the other (clear_ff) is used to clear the freeze frame conditions.

A drive cycle module 62 determines whether a drive cycle has occurred. A drive cycle is defined as an engine start-up, vehicle operation beyond the beginning of closed-loop fuel control operation as specified by the state of the OL_FLG, and engine shut-off. This module maintains a flag in KAM called CL_SEEN. When closed loop fuel control is entered this flag is set. The module 62 includes a utility to clear the CL_SEEN flag, after the information has been used to update the fuel and misfire fault code data, are required during RAM initialization. Additional the module 62 includes a utility to take KAM reset actions to clear the CL_SEEN flag.

The trips module 64 determines when vehicle operation has met a predefined set of conditions. A "trip" means vehicle operation (following an engine-off period) of duration and driving mode such that all components and systems are monitored at least once by the diagnostic system. This definition is subject to the further limitation that the trip monitoring conditions shall all be encountered at least once during an emission test cycle. All driving cycles are not trips. A driving cycle may be too short to test all systems. A TRIP flag maintained in RAM is set by the module 64 when a trip has been completed. This flag is cleared on power-up, and is set when all systems have been monitored. It can also be cleared by a scan tool reset. The sys_READY flags are initially set and subsequently cleared when the system monitor has been run a predetermined number of times deemed sufficient to permit the light to be illuminated, if appropriate. The sys_READY flags may be accessed by the issuer of vehicle license plates to determine whether it is appropriate to issue the plates. Trip completion results in a trip_complete subroutine call to the MIL controller module 20 which will determine whether to extinguish the light. Typically, three trips without a malfunction of the type that originally caused to light to be illuminated, will extinguish the light unless another independent fault dictates the illumination of the light.

The codes module 66 controls the state of various classes of fault code data that are common to all fault code records. For example, the module 66 controls the fault bit PxxxFAULT, the warmup counter PxxxCNT, and during reset controls the malfunction flag PxxxMALF, and updated flag PxxxUPDATED.

To command a system reset, the scan tool 28 sets the reset flag (OBD_RESET). When the scheduler 14 detects that the flag is set it initiates a series of subroutine calls to the other modules to effect the reset. As shown by the dotted lines in FIG. 3, a subroutine call (reset_codes) is made to the codes module 66 that initiates routines in the module to reset the fault code data to an initial state, clear the fault bit PxxxFAULT, set all warm-up counters to a value of 40, clear all the malfunction flags, the MIL_on flags, etc. The scheduler 14 also issues a subroutine call (reset_trips) to the trips module 64 to request that the module 64 clear the TRIP flag and reset all of the sys_READY flags. The scheduler 14 also issues a subroutine call (reset_mil) to the MIL controller module 20 that turns off the light 56 and resets all fault codes controlled by the module 20. Another subroutine call issued by the scheduler 14 is a clear freeze frame subroutine call (clear_ff) to the freeze frame module 60. The response by the module 60 is to load zeros in the freeze_frame record in RAM.

Figure 6:
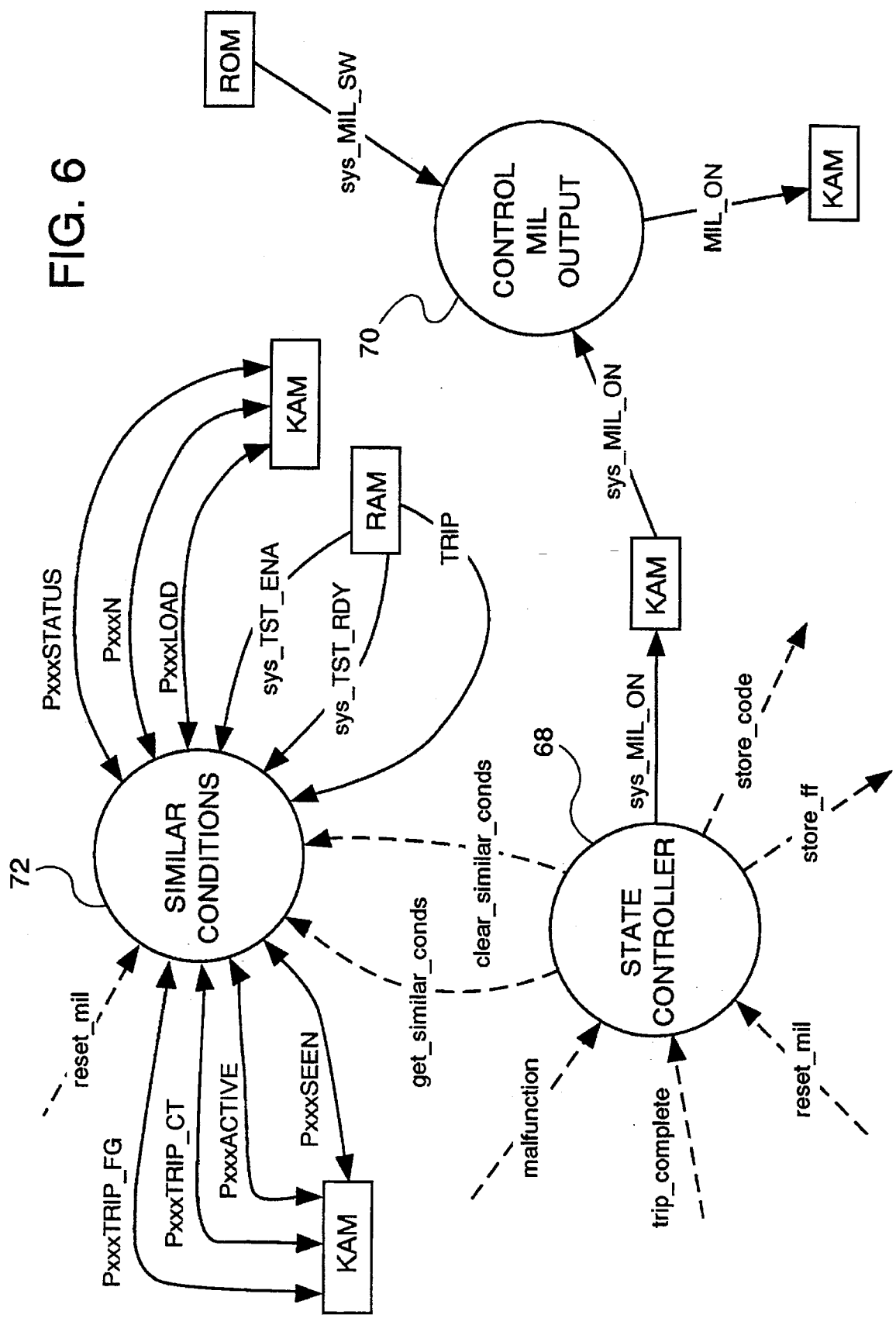
FIG. 6 is a more detailed data flow diagram of the MIL controller module of FIG. 5.

The MIL controller module 20 receives subroutine calls from the trips module 64 (trip_complete) and from the scheduler 14 (cat_complete) and issues subroutine calls (store_ff, store_code) to the freeze frame module 60 and the codes module 66, respectively. Referring now to FIG. 6 the MIL controller 20 is shown in greater detail to include three sub-modules identified as a state controller sub-module 68, a control MIL output sub-module 70, and a similar conditions sub-module 72. The sub-module 68 receives the reset_mil, trip_complete, and malfunction subroutine calls and acts as a dispatcher to the rest of the logic for controlling the light 56. These sub-modules represent finite state machines and associated data for controlling the light 56, as well as MIL output control and data. The MIL control finite state machines are event driven, those events being malfunction, trip_complete, reset_mil, and initialize_mil. The sub-module 68 processes incoming requests from the outside environment and makes calls to the appropriate sub-modules objects where the procedures are executed thus maintaining the fault code data. The sub-module 68 controls the sys_MIL_ON flags stored in KAM. In due course the module 70 reads the sys_MIL_ON flag status and sets the MIL_ON flag if the calibration item sys_MIL_SW indicates that the light is to be illuminated for this malfunction. The controller 68 also issues a store_ff subroutine call to the sub-module 60 and if appropriate, for this malfunction, will issue a store_code subroutine call to the sub-module 66. If a store_code subroutine call is made, the codes module 66 will set the fault bit and zero the warm-up counter as will be discussed more fully hereinafter. If a FUEL or MISFIRE malfunction is reported, a subroutine call may be made to the sub-module 72. The sub-module 72 is a collection of routines to manipulate the similar conditions record. The module 72 can read or write to KAM as required and responds to the reset_mil subroutine call from the scheduler 14 to zero the similar conditions record. The module 72 also reads the sys_TST_ENA and sys_TST_RDY flag to insure the FUEL or MISFIRE monitor, is both enabled and ready to determine if similar conditions have been encountered. Similar conditions, to those that were present when the original malfunction occurred, may be said to exist when, in comparison with the original data, the engine speed is within 375 rpm, the load is within 10% and the engine warm-up status is the same (e.g. cold or warmed-up), and these similar condition occur at the same time.

Figure 7:
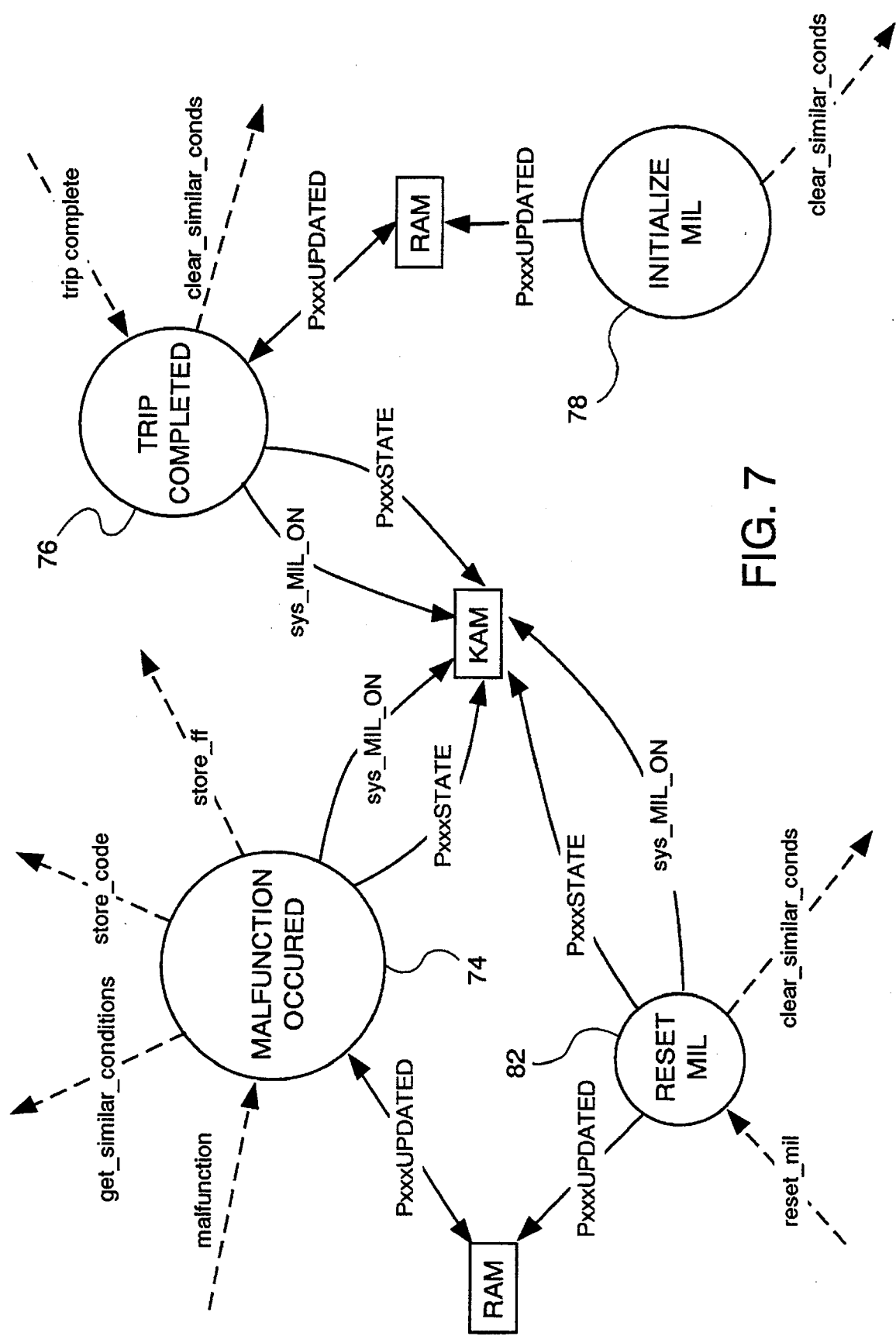
FIG. 7 is a more detailed data flow diagram of the state controller sub-module of FIG. 6.

The state controller 68 include four sub-modules identified in FIG. 7 as a malfunction occurred sub-module 74, a trip completed sub-module 76, an initialize MIL sub-module 78 and a reset MIL sub-module 82. The sub-module 78 is executed upon power_up of the computer and issues the clear_similar_conds subroutine call, if appropriate, to the sub-module 72 and clears the PxxxUPDATED flag. The sub-module 82 performs the same function in response to the reset_mil subroutine call from the scheduler 14. The sub-module 76 responds to the trip_complete subroutine call from the trips module 64 by issuing a clear_similar conditions call, if appropriate. The sub-module 74 receives the malfunction subroutine call and may issue get_similar_conditions, store_code, and store_ff calls depending on the malfunction reported.

Figure 8:
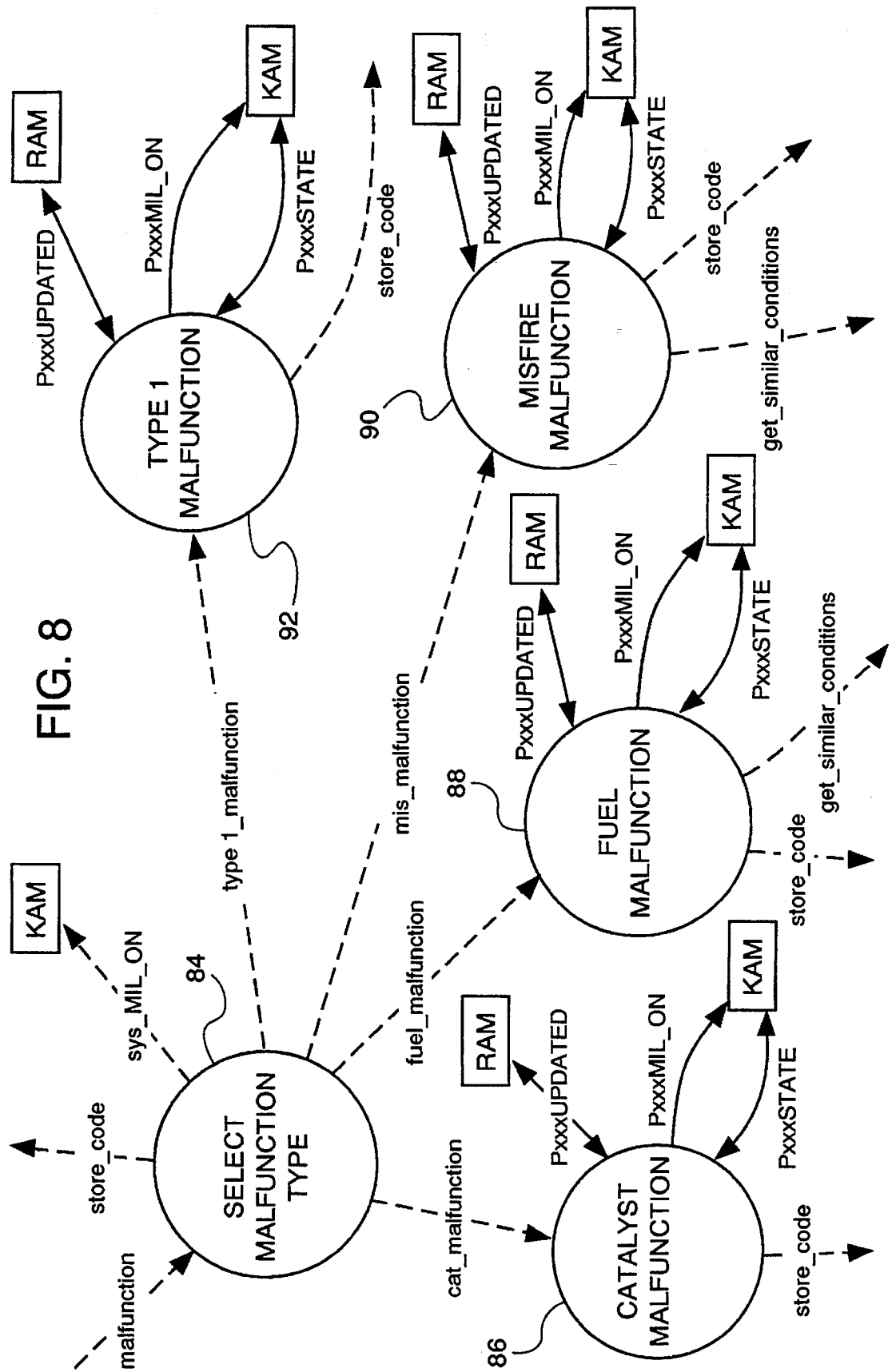
FIG. 8 is a more detailed data flow diagram of the malfunction occurred sub-module of FIG. 7.

As shown in FIG. 8, the malfunction occurred sub-module 74 includes a select malfunction type sub-module 84, a catalyst malfunction sub-module 86, a fuel malfunction sub-module 88, a misfire malfunction sub-module 90 and a type 1 malfunction sub-module 92. When one of the system monitors detects a fault and issues a malfunction call, the subroutine call is received by the sub-module 84 which identifies the source of the subroutine call and act as a dispatcher to issue the appropriate subroutine call to one of the sub-modules 86–92. Each of the sub-modules 86–92 is capable of reading and manipulating the state of the Pxxx-UPDATED bit in RAM and to issue a store_code subroutine call to the codes module 66 where appropriate. Each sub-module 86–92 is also able to set the PxxxMIL_ON flag and to read and modify the PxxxSTATE data in KAM. In addition the sub-modules 88 and 90 can issue a get_similar_conditions subroutine call to the sub-module 72.

Figure 9:
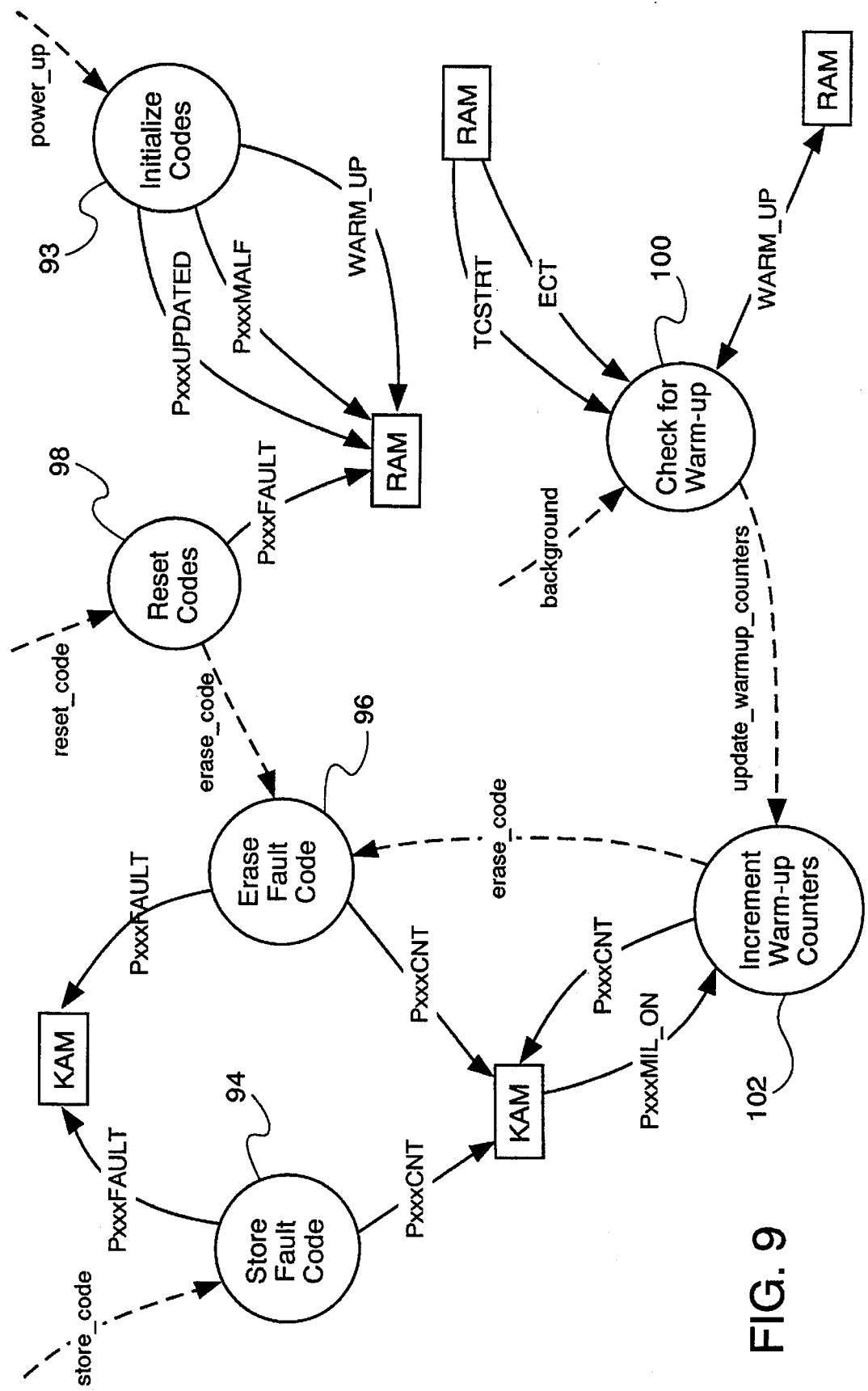
FIG. 9 is a more detailed data flow diagram of the codes module of FIG. 5.

Referring now to FIG. 9, the codes module 66 is shown in greater detail. The codes module 66 includes an initialize codes sub-module 93 which responds to a power-up event by clearing the PxxxMALF and PxxxUPDATED flags. The codes module 66 also includes a store fault code sub-module 94 which responds to the store_code subroutine call by writing to the fault bit PxxxFAULT and warm up counter PxxxCNT in KAM. In response to a reset_codes subroutine call from the scheduler 14, an erase_code subroutine call is made to an erase fault code sub-module 96 from a reset codes sub-module 98. The sub-module 96 resets the PxxxFAULT bit in KAM and sets the warm-up counter to a maximum value of 40. A check for warm-up sub-module 100 performs a background task that checks to see if engine coolant temperature (ECT), after an engine start, has reached 160 degrees F. and has heated up at least 40 degrees from the temperature when the engine was first started (TCSTRT). If so a WARM-UP flag is set in RAM and an update_warmup_counters subroutine call is made to an increment warm-up counters sub-module 102 which increments each of the warm-up counters in KAM. If PxxxMIL_ON is not set and 40 warm-up cycles have occurred, the module 102 issues an erase_code subroutine call to the module 96 to erase the fault code specified by Pxxx, thus clearing the PxxxFAULT bit.

The light 56 is controlled via four different finite state machines, one each for FUEL, MISFIRE, CATALYST and TYPE 1 (EGO, EGR, PURGE, SAIR). Each of the four finite state machines control individual MIL_ON flags for each fault code it services and these flags control whether the light is illuminated or extinguished.

Figure 10:
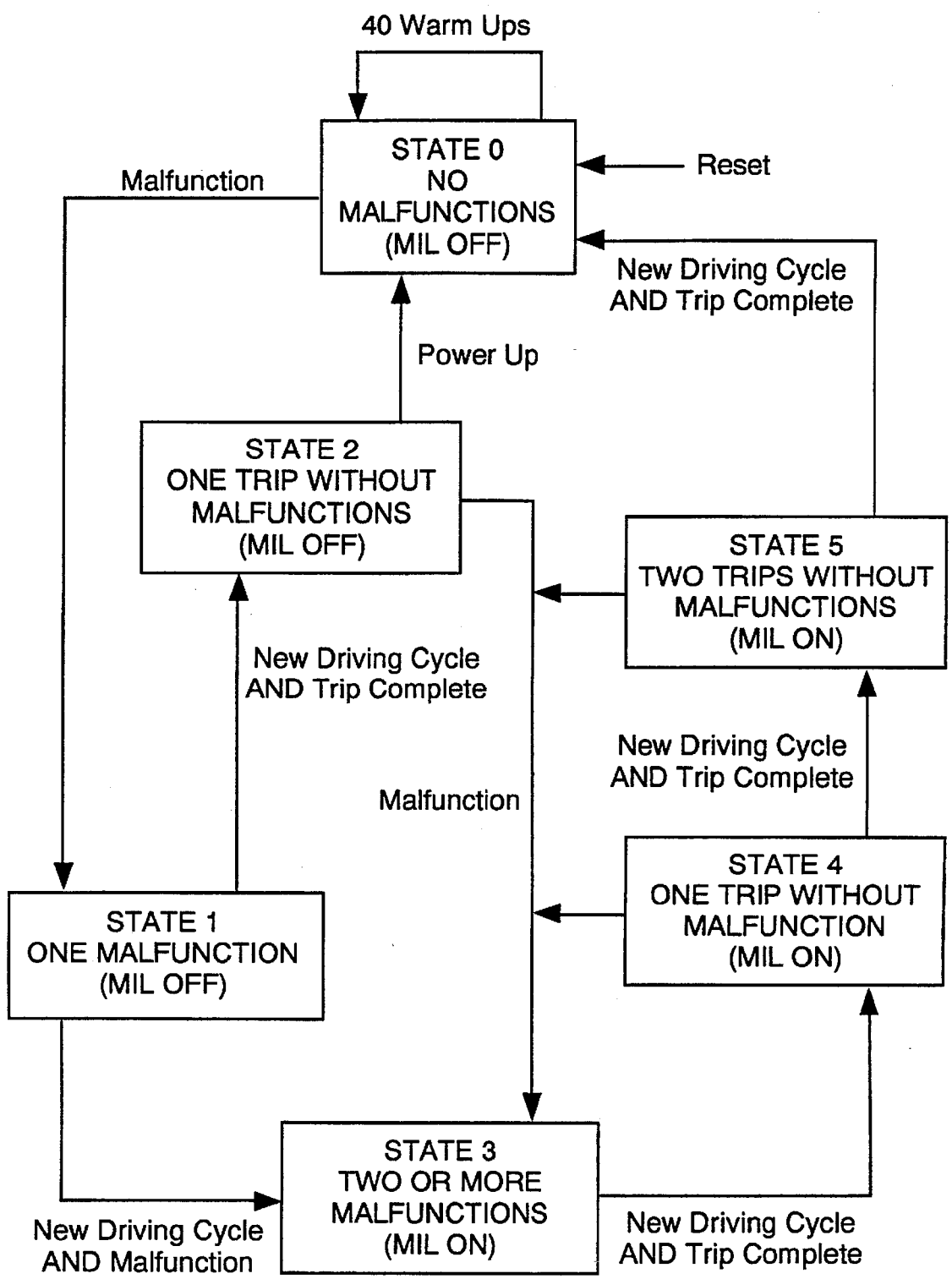
FIG. 10 is a state diagram of the Type 1 system monitor MIL state controller.

The finite state machine implementation of the Type 1 MIL state controller is shown in FIG. 10. The Type 1 state machine can assume one of six states identified as STATE 0 through STATE 5. The logic implemented by the Type 1 state machine operation illuminates the light no later than the end of the next trip, if a Type 1 malfunction is again detected. The light is extinguished if the fault does not recur during three sequential trips.

During the following discussion it will be assumed that the On-Demand self test mode is not active since the MIL controller state machines cannot change states during a self test mode. For the sake of brevity, unless otherwise stated, it will be assumed that a power-up of the PCC has occurred so that PxxxUPDATED has been reset to 0 when a Pxxx malfunction or trip completion event occurs and each time a Pxxx malfunction or trip completion event occurs the PxxxUPDATED bit is set to 1. Also, upon transition, PxxxSTATE will be set to the new state.

The Type 1 MIL state controller will be placed in STATE 0 by a reset command from the scan tool. If a Type 1 malfunction occurs while the controller is in STATE 0, the machine transitions to STATE 1 representing the occurrence of one malfunction. In STATE 1, the light remains off. Any other Pxxx malfunctions occurring prior to the next computer power up will not affect the state of the machine since PxxxUPDATED must be reset to 0, as a result of a computer power up, before a transition can occur. If a trip is completed while in STATE 1 the machine transitions to STATE 2 representing one trip completion without a malfunction. If a malfunction occurs while in STATE 1, the machine transitions to STATE 3, the Pxxx_MIL_ON flag is set and the light is illuminated, and the Pxxx fault code is stored in KAM. Any further malfunctions occurring while in STATE 3 do not cause a transition regardless of the state of PxxxUPDATED. If a trip is completed while in STATE 3, the machine transitions to STATE 4. If a trip is completed while in STATE 4 the machine transitions to STATE 5. In STATES 4 and 5 the light remains on. If a malfunction occurs while the machine is in STATES 2, 4 or 5 the machine transitions back to STATE 3 regardless of the state of PxxxUPDATED. If however, a third successive trip is completed without a malfunction, the machine transitions from STATE 5 to STATE 0 and the PxxxMIL_ON flag is reset to turn the light off. The fault code is erased if the fault does not recur during 40 warm-up cycles following a return to STATE 0.

Figure 11:
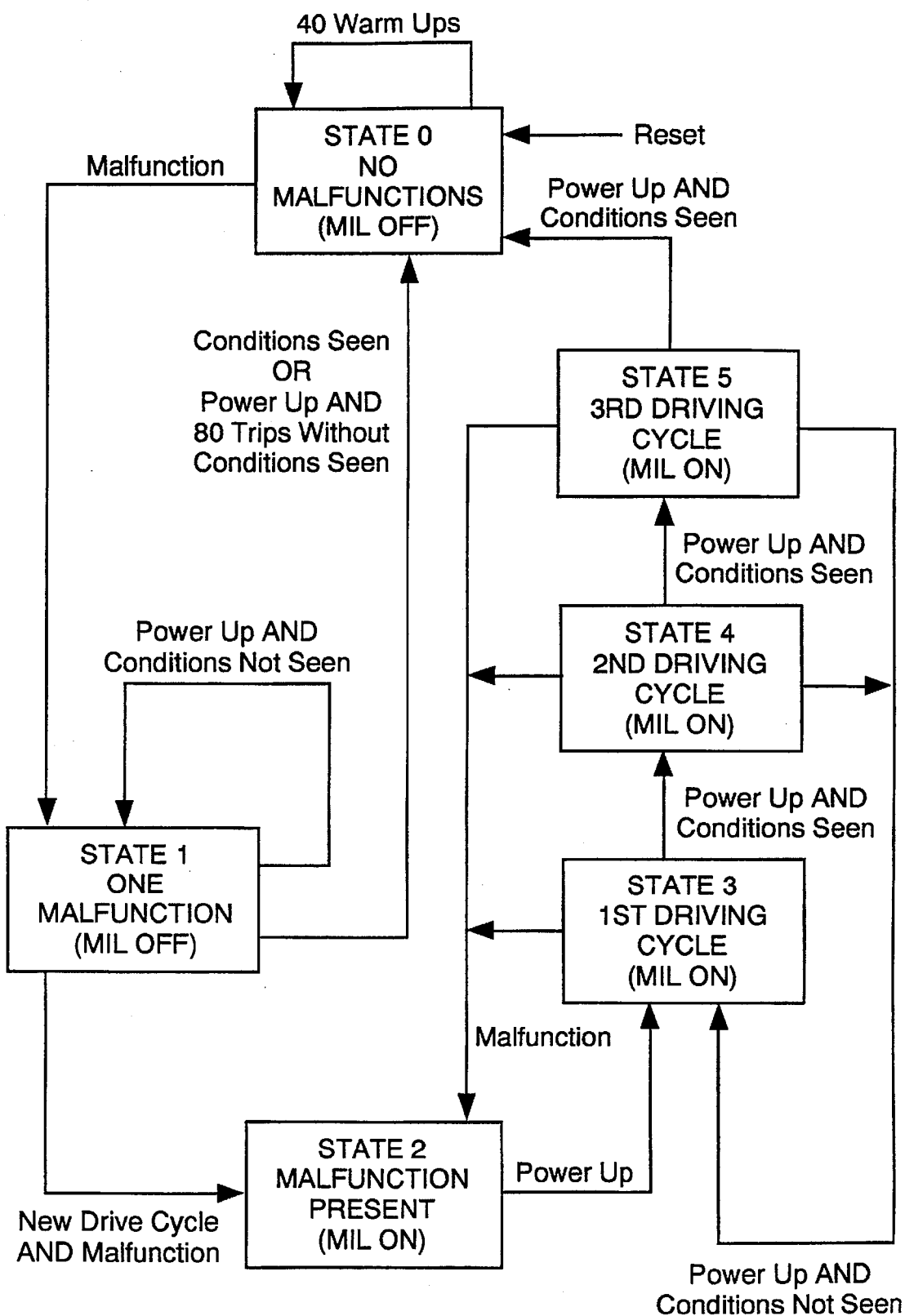
FIG. 11 is a state diagram of the fuel system monitor MIL state controller.

The finite state machine for the FUEL MIL state controller is shown in FIG. 11. As with Type 1, the machine includes six states, 0–5, and the light is illuminated no later than the end of the next trip, in which the malfunction is again detected. However, the first occurrence is ignored if similar conditions are encountered prior to a second occurrence. Also, the first occurrence is ignored if similar conditions are not encountered during 80 trips subsequent to the initial fuel malfunction without the same fuel malfunction occurring. The light is extinguished if the fault does not recur during three sequential driving cycles with conditions similar to those when the malfunction was first determined.

With reference to FIG. 11, on reset the machine is placed in STATE 0 wherein the PxxxMIL_ON is reset and the clear_similar_conditions subroutine call is made. If a fuel malfunction occurs while in STATE 0, the machine transitions to STATE 1, and the get_similar_conditions subroutine call is made to capture the speed, load and warm-up status at the time of the malfunction. The occurrence of a malfunction while in STATE 1 causes a transition to STATE 2 where the FUEL_MIL_ON flag is set and the light is illuminated, and the store_code subroutine call is made to store the fault code. On the next power up, the machine transitions to STATE 3 and the PxxxSEEN flag is reset. If a drive cycle is completed (CL_SEEN set to 1), while in STATE 3 and if similar conditions occur during the drive cycle (PxxxSEEN set to 1) then on the next power up the machine transitions to STATE 4 and the PxxxSEEN and CL_SEEN bits are cleared. If a drive cycle is completed while in STATES 4 and 5 and similar condition are encountered in each drive cycle, then upon power up following the completion of the third consecutive drive cycle the machine transitions to STATE 0, the FUEL_MIL_ON flag is reset to extinguish the light, and a clear_similar_conditions subroutine call is made to clear the similar conditions data for the fuel malfunction Pxxx. If while the machine is in STATES 3, 4, or 5, the same fuel malfunction occurs, the machine transitions to STATE 2. If upon power up while in STATE 4 or 5 with CL_SEEN set to 1 but PxxxSEEN reset to 0, indicating a drive cycle was completed but similar condition were not encountered, then the machine transition to STATE 3 and again looks for three consecutive drive cycles during which similar condition are encountered without the fuel malfunction occurring.

If while the machine is in STATE 1, the similar conditions are seen (PxxxSEEN set to 1), then the machine transitions to STATE 0 where the clear_similar_conditions subroutine call is made. As indicated by the loop in STATE 1, a trip counter (PxxxTRIP_CT) is incremented each time a trip is completed without encountering similar conditions or a second malfunction. If 80 such trips are completed, the machine transitions to STATE 0. The fault code is erased if the fault does not recur during 40 warm-up cycles following a return to STATE 0.

Figure 12:
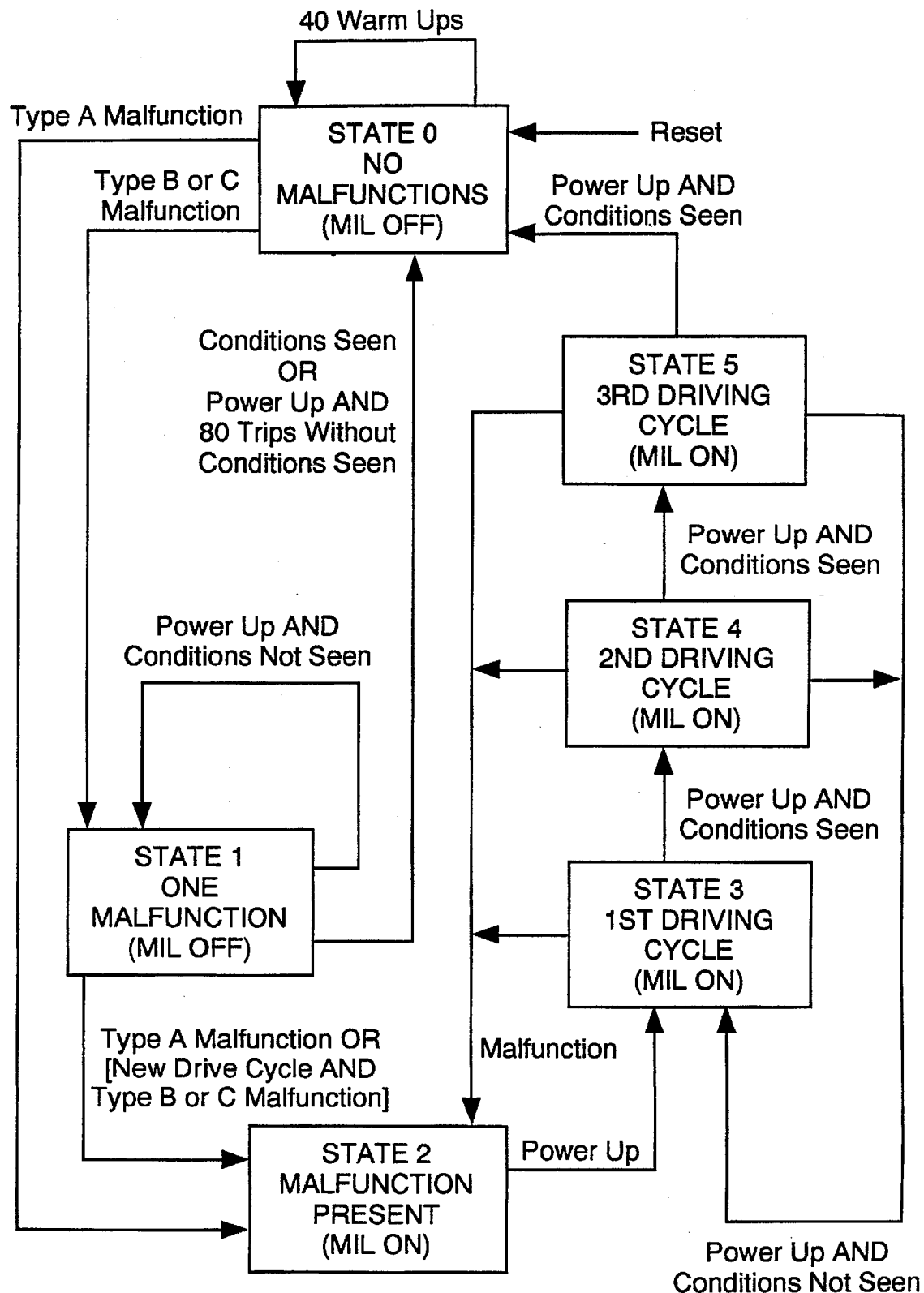
FIG. 12 is a state diagram of the misfire system monitor MIL state controller.

Operation of the misfire MIL state machine is shown in FIG. 12 for both type A and other types of misfires. A type A misfire is a percent misfire which would result in catalyst damage. Other types of misfires (generally referred to as type B or C) are percent misfires which cause increased emissions but not catalyst damage. For the type A misfire the light is intermittently illuminated at a rate of once per second during actual misfire when fuel cutoff actions are not being taken, and remains continuously illuminated otherwise. For other misfires the light is illuminated after two driving cycles containing misfire. The first occurrence is ignored if similar conditions are encountered without misfire, prior to a second occurrence. Also, the first occurrence is ignored if similar driving conditions are not encountered during 80 trips, subsequent to the initial malfunction. The light is extinguished if the fault does not recur during three sequential driving cycles with conditions similar to those when the malfunction was first determined.

With reference to FIG. 12, upon reset the machine is placed in STATE 0 and the light is extinguished. If a type A misfire malfunction occurs during STATE 0, the machine transitions to STATE 2 where the MIS_MIL_ON flag is set and the light is illuminated as described above. The get_similar_conditions subroutine call is made followed by the PxxxACTIVE bit being set to 1. Subsequently the store_codes subroutine call is made. If other than a type A misfire malfunction occurs during STATE 0, the machine transitions to STATE 1 where the light remains off, and the get_similar_conditions subroutine call is made. If a malfunction occurs while in STATE 1, the machine transitions to STATE 2 where the light is illuminated. It should be noted that if a Type A misfire occurs while in STATE 1, a transition to STATE 2 occurs regardless of the state of the PxxxUP-DATED flag. From STATE 2 the machine will move progressively through STATES 3, 4 and 5 to STATE 0, if similar conditions are encountered during three successive drive cycle without an intervening malfunction, as discussed with respect to the fuel state machine. Also, as with the fuel machine, the PxxxTRIP_CNT is incremented for each trip that occurs while the machine is in STATE 1. After 80 such trips without a recurrence of the misfire malfunction, the machine transitions to STATE 0. Also, if while the machine is in STATE 1, the similar conditions are seen (PxxxSEEN set to 1), then the machine transitions to STATE 0 where the clear_similar_conditions subroutine call is made. The fault code is erased if the fault does not recur during 40 warm-up cycles following a return to STATE 0.

Figure 13:
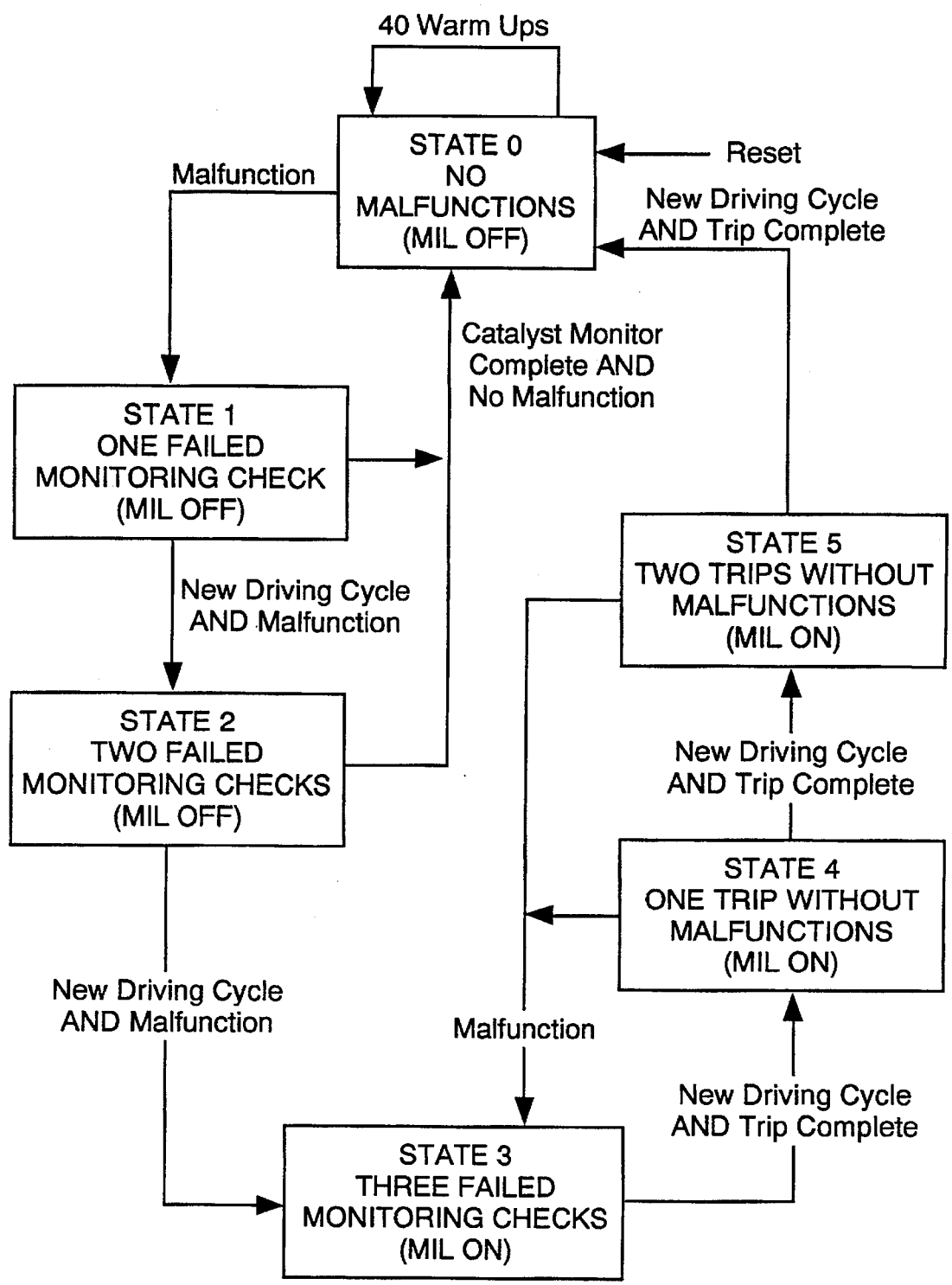
FIG. 13 is a state diagram of the catalyst system monitor MIL state controller.

The catalyst MIL state machine is depicted in the state diagram of FIG. 13. A malfunctions occurs when a check of the heated catalyst system shows a drop in total hydrocarbon conversion efficiency by 50%. The machine is placed in STATE 0 upon system reset and transitions progressively through STATES 1, 2 and 3 upon three sequential failed monitoring checks. The three checks do not occur on the same driving cycle. The fault code is stored and the light is illuminated upon transition to STATE 3. If a catalyst check is completed without a malfunction, while in STATES 1 or 2 the machine transitions to STATE 0. The machine transitions through STATES 4 and 5 to STATE 0, where the light is extinguished, if three sequential trips occur without a malfunction. The machine will remain in STATE 3 or return to STATE 3 if a malfunction occurs prior to a trip completion. The fault code is erased if the fault does not recur during 40 warm-up cycles following a return to STATE 0.

While the best mode for carrying out the invention has been described in detail, those familiar with the art to which this invention relates will recognize various alternative designs and embodiments for practicing the invention as defined by the following claims.

We claim:

1. A computer program architecture for a motor vehicle on-board diagnostic system including a computer having read only, random access, and keep alive memory, comprising:

a plurality of monitor modules for monitoring respective ones of a plurality of vehicle systems or components and for issuing a malfunction subroutine call upon detecting and verifying a system or component malfunction, an executive program module interfaced with said monitor modules and including a diagnostic scheduler module for controlling and coordinating a sequence of enablement of said monitor modules, a malfunction indicator light (MIL) controller module for issuing a store code subroutine call and illuminating a light in response to a malfunction subroutine call, a codes module responsive to said store code subroutine call for storing a fault code in said keep alive memory, wherein said scheduler module disables said monitor modules and enables and controls the sequence of running of a plurality of on-demand self test routines in response to a self test command, and wherein said self test routines include an engine running test, an engine off test, and an output test mode, said scheduler suspending execution of any monitor module test in response to said self test command and returning to the suspended test upon completion of the self test.

2. The program architecture defined in claim 1 wherein system configuration data is contained in read only memory which establishes which of said plurality of monitor modules are available to perform a test, said scheduler module utilizing said data in determining said sequence.

3. The program architecture defined in claim 1 wherein said executive program module further comprises a system failure mode effects management module for advising said scheduler module of any monitor module in said sequence that should not be enabled because of an existing system or component malfunction.

4. The program architecture defined in claim 1 wherein said MIL controller module initiates an erase code subroutine call to request erasure of the stored fault code if said store code subroutine call is not issued within a predetermined number of engine warm-up cycles after the light is extinguished wherein a warm-up cycle is defined as vehicle operation, after an engine off period, with engine coolant temperature at least a first predetermined temperature which is a predetermined number of degrees warmer than when the engine was initially started.

5. The program architecture defined in claim 1 wherein said executive program module further comprises a trips module for issuing a trip complete subroutine call in response to completion of all system monitor routines during vehicle operation following an engine off period.

6. The program architecture defined in claim 5 wherein said MIL controller module is responsive to said malfunction subroutine call and to said trip completion subroutine calls for controlling the illumination of said light in accordance with a predetermined sequence of malfunction and/or trip completion events.

7. The program architecture defined in claim 5 wherein said MIL controller module illuminates said light and initiates said store code subroutine call if a malfunction is detected following each of two separate power up sequences of the computer and extinguishes said light if said malfunction does not recur within three sequential trips of the vehicle following illumination of the light.

8. The program architecture defined in claim 7 wherein said fault code is erased after a predetermined number of engine warm-ups, following extinguishing of said light, without a recurrence of said malfunction.

9. The program architecture defined in claim 5 wherein said vehicle includes a catalytic converter system and one of said system monitor modules reports a malfunction in the converter system, and wherein said MIL controller module illuminates said light and initiates said store code subroutine call event after three sequential malfunction occurrences on separate power up sequences, and extinguishes said light if said malfunction does not recur within three sequential trips of the vehicle following illumination of the light.

10. The program architecture defined in claim 9 wherein said fault code is erased after a predetermined number of engine warm-ups, following extinguishing of said light, without a recurrence of said malfunction.

11. The program architecture defined in claim 1 wherein said executive program module further comprises a freeze frame data module for capturing predetermined vehicle data and for storing captured data in a freeze frame data record in keep alive memory in response to a store freeze frame subroutine call from said MIL controller module, said MIL controller module issuing said freeze frame subroutine call upon receipt of a malfunction subroutine call from one of said monitor modules.

12. The program architecture defined in claim 1 wherein said executive program module further comprises a drive cycle module, a closed loop flag that is cleared during each power up initialization of said computer, said drive cycle module setting said closed loop flag when the vehicle enters closed loop fuel control operation, to provide an indication of completion of a driving cycle, said MIL controller module including a similar conditions module which sets a similar conditions seen flag if engine speed is within a predetermined number of rpm, engine load is within a predetermined percentage, and engine temperature status is the same, to those that existed when a first malfunction was detected.

13. The program architecture defined in claim 12 wherein said MIL controller module illuminates said light and initiates a store code subroutine call if a type A misfire malfunction is detected and extinguishes said light if said malfunction does not recur during three sequential driving cycles in which said similar conditions seen flag is set.

14. The program architecture defined in claim 13 wherein said fault code is erased after a predetermined number of engine warm-ups, following extinguishing of said light, without a recurrence of said malfunction.

15. The program architecture defined in claim 12 wherein said MIL controller module illuminates said light and issues said store code subroutine call, if a malfunction is detected following each of two separate power up sequences of the computer and extinguishes said light if said malfunction does not recur during three sequential driving cycles in which said similar conditions seen flag is set.

16. The program architecture defined in claim 15 wherein said fault code is erased after a predetermined number of engine warm-ups, following extinguishing of said light, without a recurrence of said malfunction.

17. The program architecture defined in claim 15 wherein the first occurrence of a malfunction is ignored if said similar conditions seen flag is set prior to the second occurrence of a malfunction or if a predetermined number of trips occur without said similar conditions seen flag being set.

\* \* \* \* \*